United States Patent [19]
Zagalskiy

[11] Patent Number: 5,944,250
[45] Date of Patent: Aug. 31, 1999

[54] SOLDERING METHOD AND APPARATUS

[75] Inventor: Garri Zagalskiy, Philadelphia, Pa.

[73] Assignee: H-Squared Technologies, Portland, Oreg.

[21] Appl. No.: 08/736,057

[22] Filed: Oct. 23, 1996

[51] Int. Cl.$^6$ .................................................. B23K 1/08
[52] U.S. Cl. ........................................ 228/207; 228/223
[58] Field of Search .................................. 228/207, 223, 228/40

[56] References Cited

U.S. PATENT DOCUMENTS

| | | | |
|---|---|---|---|
| 2,161,556 | 6/1939 | Carroll et al. | 228/223 |
| 2,321,071 | 6/1943 | Ehrhardt et al. | 228/207 |
| 4,224,086 | 9/1980 | Stokes | 148/26 |
| 4,571,352 | 2/1986 | Aoki | 427/431 |
| 5,095,973 | 3/1992 | Toy | 165/185 |

FOREIGN PATENT DOCUMENTS 1-270388  10/1989  Japan ...................................... 228/207

OTHER PUBLICATIONS

Schwartz, MM, "Brazing" in Encylopedia of Materials Science and Engineering, vol. 1, pp. 407–411, Pergamon Press (1986).
Manko HH, Solders and Soldering, pp. 27–31 and 191–199, McGraw Hill Book Co. (1979).
Metals Handbook, $9^{th}$ Ed., vol. 6–Welding, Brazing, and Soldering, pp. 5,8,11, 989–995, 1022–1032, 1080–1086, Am. Soc. For Metals (1983).
Hershberger et al., "Immersible Solder Wave System," *IBM Tech. Discl. Bull.*, vol. 20, No. 6 (Nov. 1977) p. 2156.
Backes et al., "Vibration Soldering Equipment," *IBM Tech. Discl. Bull.*, vol. 27, No. 1A (Jun. 1984) pp. 71–72.

*Primary Examiner*—Patrick Ryan
*Assistant Examiner*—Jeffrey T. Knapp
*Attorney, Agent, or Firm*—Chernoff, Vilhauer, McClung & Stenzel, LLP; Howard Eisenberg

[57] ABSTRACT

A method for soldering is disclosed wherein parts to be soldered are passed sequentially into and out of a flux and a solder bath. The flux cleans the parts of surface debris, such as oxides, before the parts are immersed in the solder.

19 Claims, 1 Drawing Sheet

SOLDERING METHOD AND APPARATUS

FIELD OF THE INVENTION

The present invention relates to the field of joining two or more parts, like metal parts, by soldering.

BACKGROUND

In conventional soldering, two metal parts to be soldered are cleaned, and a flux is applied to the portions of the parts to be joined. Solder and heat are applied. The solder melts and later solidifies to bond the parts.

Various means have been developed to improve the soldering process, such as dip soldering. Dip soldering may be performed in one of two methods.

In one method, solder is placed in position between the surfaces of two parts which are to be bonded. The parts are then dipped into a bath of flux at a temperature above the melting temperature of the solder, causing the solder to melt. Disadvantages of this method include the difficulty in positioning solder in hard to reach places between small parts and in soldering irregularly shaped parts with non-matching surfaces.

In a second method, parts to be soldered are dipped into a bath of molten solder. Before dipping, the parts to be soldered are thoroughly cleaned of oxides and surface debris, most commonly by mechanical means. This labor intensive cleaning is impractical when large parts, such as aircraft wings, are to be soldered and may be impossible when soldering smaller parts having a large surface area, such as a beat exchanger.

The present invention contributes to a solution to the problems of the prior art. The method and apparatus of the present invention permit soldering parts of any shape without prior mechanical cleaning of surface debris.

SUMMARY OF THE INVENTION

In one embodiment, the present invention is a method for soldering a multiplicity of parts by passing, dipping, or submerging the parts into a flux which removes surface debris, such as oxides, from the parts, removing the parts from the flux, passing, dipping, or submerging the parts into a solder, and removing the parts from the solder. If desired, the parts may then be passed again into and out of a flux.

In another embodiment, the present invention is an apparatus for soldering a multiplicity of parts. The apparatus comprises a container containing a layer of a flux, a layer of a solder, means for heating the layers to a temperature above the melting point of the flux and the solder, and means for lowering and raising parts to be soldered into and out of the flux and the solder layers.

The invention is suitable for a variety of manufacturing practices involving a multiplicity of small parts, such as in the manufacture of automobile radiators, heat exchangers, electrical connections, and jewelry. The invention is equally suitable for joining large parts, such as in plumbing, and automobile or aircraft assembly.

The invention permits soldering parts of any shape, whether the parts are of regular shape, that is that the parts are mutually congruent and can be fitted together, or of irregular shape, that is that the parts have little or no relative congruency and do not fit together. Additionally multiple parts of varying shapes and sizes can be soldered together by positioning the parts in a desired bonding position within a form or a frame which holds the parts in position and allows the flux and the solder to contact the surfaces of the parts to be bonded.

DETAILED DESCRIPTION OF THE INVENTION

Figure 1:
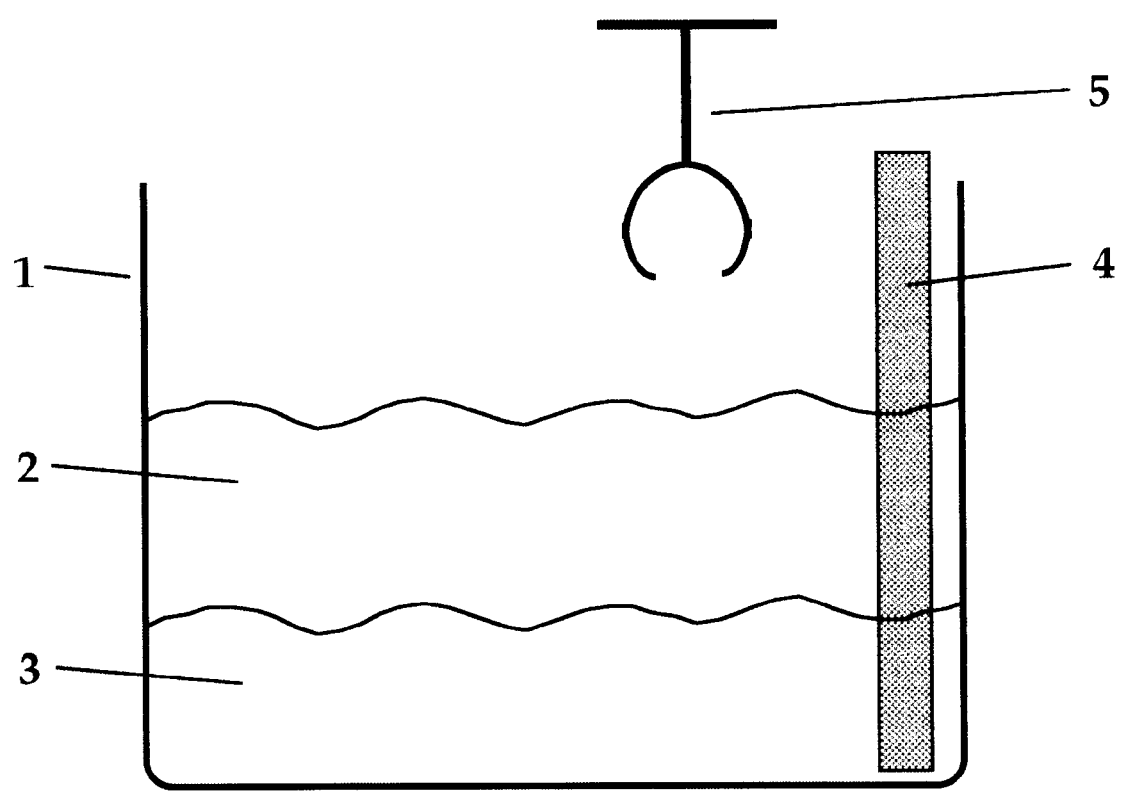
FIG. 1 shows a diagram of a preferred embodiment of the apparatus of the invention.

In accordance with the method of the invention, a multiplicity of parts, such as metal parts, are soldered together by passing the parts successively into a flux and directly into molten solder, then removing the parts from the solder.

The parts may be any parts which are capable of being soldered together, such as metal parts like iron, steel, copper, lead, tin, aluminum, and silver, or alloys thereof, including metal covered or metallicized parts, such as a metal-coated ceramic part. The parts may be non-metallic parts or a combination of metallic and non-metallic parts. In a preferred embodiment, the metal parts are aluminum parts.

The flux may be any flux which is capable of removing surface debris, including oxides, from the surface of parts to be soldered and which will not adversely affect the soldering process. The flux may be in any physical state, for example, a liquid, a powder, a gel, a solid, or a vapor. In a preferred mode, the flux is a liquid at the temperature at which the parts to be soldered are exposed to the flux.

As an example, the flux may comprise an acid, such as $HNO_3$, $HCl$, $HF$, or $H_2SO_4$. Alternatively, the flux may comprise a medium of melted salt, in which the salt or salts are sufficiently chemically active to destroy the surface debris, such as oxides, from the surface of the parts to be soldered. For example, salts, such as halides, of a +1 or +2 or +3 valence element are suitable. The salts may be comprised of −1, −2, or −3 valence anions or radicals, such as salts of acids like $NO_3^-$, $SO_4^-$, $SiO_4^-$, or $PO_4^-$.

Examples of suitable salts include, but are not limited to, sulfides, fluorides, chlorides, bromides, and iodides of sodium, calcium, potassium, magnesium, silicon, and lithium. Salts, such as halide salts, of non-elemental cations, such as ammonium, are also suitable for the melted salt flux. If desired, the medium may comprise a mixture of salts. NaCl is a readily available and inexpensive salt which is suitable for the flux. In a preferred embodiment, the flux comprises a fluoride salt, such as potassium or sodium fluoride.

The solder is selected based on the materials to be bonded. Any solder that is suitable for soldering the parts by conventional soldering is suitable for the method of the invention. For example, conventional solders, such as lead/tin, tin/antimony, tin/silver, or aluminum solder, are suitable for the method of the invention. The solder may be in any physical form. If the solder is a solid, it is preferred that the melting temperature of the solder is below that of the materials to be bonded.

In accordance with the method of the invention, parts to be bonded are positioned in a desired bonding position, which may be by means of a form or a frame. If it is desired that the frame be bonded to the parts, the frame may be of the same material as the parts or of a different material which will bond to the parts by the soldering process. Alternatively, the frame may be of a material which will not bond to the parts, which material has a melting temperature higher than that used in the soldering process and which is relatively inert to the solder and the flux used in the soldering process.

The parts are then passed into a flux. The flux, for example the melted salt flux, is at a temperature above the melting point of the flux and below the melting point of the parts.

The parts remain in the flux for time sufficient to remove surface debris, including oxides. The parts are then removed from the flux. If oxides or other debris remain on the parts after removal from the flux, the parts may be passed again into and out of the flux as needed.

Typically, the parts remain in the flux for only a short time, such as 1 to 5 seconds, although if needed, for example to remove a heavy oxide layer, the parts may remain in the flux for longer periods of time, such as 10, 20, or 30 seconds, or even up to one minute or longer. Generally, because the melted salts are corrosive and may eventually react with the parts to be soldered, the parts should remain in the flux for as little time as is necessary to remove the surface debris. Heavier articles, such as metal sheets, may generally be permitted to remain in the melted salt flux for longer periods of time than delicate articles.

The parts are then removed from the flux. It is preferred that the removal from the flux is performed with a turbulent upward motion to shake off flux that adheres to the parts.

After removal from the flux, and before oxides or other debris reforms on the surface of the parts, the parts are passed into a layer of solder for a time sufficient to fill with solder the contact spaces between the parts to be bonded. The solder is preferably at a temperature above the melting point of the solder, but below that of the parts to be bonded. The parts need to remain in the solder for a short time, such as one second, although times of up to 10 to 15 seconds or more may be needed when soldering large articles or articles with intricate surfaces. Generally, longer times in the molten solder are not harmful to the soldering process or to the parts to be soldered.

Following the bath in the solder, the parts are removed from the solder. Removal of the parts from the solder is preferably by turbulent motion to shake residual solder from the parts.

The parts may be immersed into a second flux, which may the of the same composition as the first flux, to remove excess solder from the surface of the parts. The parts should remain in the flux for a short time, only as long as necessary to remove the excess solder, so as to avoid corrosive effects of the flux on the parts and on the solder.

After soldering by the method of the invention, the parts are preferably cleaned of residual flux and/or excess solder by any suitable method or combination of methods, such as by shaking, steam cleaning or water spray. If desired, the removed salts may be recycled by collecting the water used to clean the parts, allowing the water to evaporate, and returning the salts that remain following the evaporation of the water to the flux used in the soldering process. Following the cleaning, the solder in the contact spaces between the parts is permitted to cool and to harden to a strong bond.

The flux and the solder for the method of the invention may be in separate containers, such as tanks, vats, or tubs. If separate containers are used for the flux and the solder, the parts are removed from the flux and are passed through air before being immersed in the solder bath. During the time in the air, oxides may reform on the surface of the parts. Therefore, the parts should be bathed in molten solder in as short a time as possible following removal from the flux, before the reformation of surface oxides.

In a preferred embodiment, the flux and the solder form separate layers within a single container, wherein the flux layer is positioned above the solder layer. The flux and solder layers may be in contact with each other, although one or more layers of other media, such as a cleaning medium, may be positioned between the flux and solder layers. Parts to be soldered are passed into the flux by being lowered into the flux, then are removed from the flux by further lowering into the solder. The parts are then removed by raising the parts from the solder and are passed again through the flux layer above the solder, preferably by a turbulent, shaking motion, which removes excess solder remaining on the surface of the parts. The solder removed from the surface of the parts sinks through the flux to return to the layer of molten solder below where it may be reused. Thus, the solder is recycled and wastage of solder is minimized. The parts are then removed from the flux and the surfaces of the parts may be cleaned of flux and solder.

A second embodiment of the invention is an apparatus for soldering parts. In a preferred embodiment as shown in FIG. 1, the apparatus comprises a container 1, such as a tank or a vat, which contains a layer of a medium of flux 2, such as melted salts, above and in contact with a layer of molten solder 3. The apparatus further comprises a means 4 for heating the two layers to a temperature above the melting point of the solder. The apparatus further comprises a means 5 for lowering parts to be soldered through the melted salt medium and into the molten solder layer, and for raising the parts from the molten solder through the flux layer.

The container for the flux and solder layers may be of any material which is non-porous, will not react chemically with the flux or the solder, and which is capable of withstanding temperatures above the melting points of the flux and the solder. Preferably, the container should have a smooth surface which is readily cleaned. Examples of suitable containers include vats or tanks made of metals, such as steel, or of non-metal materials, such as stone, glass, or heat resistant plastic.

Any means which is capable of heating the flux and solder layers to a temperature above the melting point of the flux and the solder is suitable for use in the apparatus. For example, the heating means may be comprised of positive and negative electrodes within the container for electrolytic heating, or may be by electric current on the exterior of the container.

Any means which is capable of lowering parts to be soldered through the flux layer and into the molten solder is suitable for the lowering means of the apparatus. Further, any means which is capable of raising parts to be soldered from the molten solder through the flux layer is suitable for the raising means of the apparatus. Generally, the lowering means and raising means will be reciprocal actions of the same means. Preferably, the raising means has the capability of jerking, turbulent motion to aid in removing excess flux and/or solder from the parts by shaking. Examples of suitable means for lowering and/or raising the parts include winches, cables, hoists, crane, elevators, and other means.

The apparatus of the invention is especially well suited for the preservation of excess solder. That is, excess solder which is removed from the surface of the parts during upward passage through the flux is recycled as it returns through the flux to the solder, where it can be used in subsequent soldering operations. Salt which remains on the parts following soldering may also be recycled. Thus, the wastage of solder and salts is minimized and contamination of the environment due to disposal of the excess solder and salts is greatly reduced.

EXAMPLE 1

Multiple aluminum alloy parts of irregular shape are positioned in desired relative bonding position within an aluminum alloy frame which permits fluids to flow freely around the parts. The frame is immersed for about two seconds into a bath of a melted salt flux comprising a combination of salts including approximately 80% NaCl, 5% each of NaF and KCl, 1% each of NaI, KI, KBr, and CaSO$_4$, and 0.5% each of MgSO$_4$ and SiNO$_3$. The temperature of the melted salt flux mixture is about 600° C., which is above the melting point of the salt mixture, determined to be about 500° C. The frame is then removed from the melted salts flux by lowering the frame into a bath of a molten Al-Si alloy (silumin) solder. The temperature of the solder is about 600° C., above the melting point of the solder which is about 560° C. After about five seconds in the solder, the frame is removed from the solder by raising with a turbulent, shaking motion through the flux, so that the frame remains in the flux for about two seconds. Following removal from the flux, the frame and the parts within the frame are cleansed of residual flux by steam and water spray. The parts are allowed to cool and are bonded together in a strong solder bond which bond is determined to be stronger than the substance of the aluminum alloy parts themselves.

EXAMPLE 2

Multiple aluminum alloy metal parts are positioned in a nickel/chrome alloy frame and are soldered following the method of Example 1, except that the salts of the melted flux are a mixture of about 85% NaCl, 5% to 7% each of NaF, and 1% CaSO$_4$. Following soldering and cleansing, the nickel/chrome alloy frame is removed from the bonded aluminum alloy parts. The parts are bonded together in a strong solder bond which bond is determined to be stronger than the substance of the aluminum alloy parts themselves.

EXAMPLE 3

Multiple steel parts of irregular shape are positioned in desired relative bonding position within a nickel/chromium alloy frame and are soldered by the method of Example 2, except that the flux is a melted salt flux comprising about 100% NaF, the solder is a tin/antimony solder, and the temperature of the flux and solder is about 1000° C. Following soldering and cleansing, the nickel/chrome alloy frame is removed from the bonded steel parts. The parts are bonded together in a strong solder bond.

Many modifications and variations of the present invention as described and claimed herein may be apparent to those skilled in the art. It is intended that these modifications and variations are embodied in the following claims.

What is claimed is:

1. A method for joining a multiplicity of aluminum parts which are positioned in relative bonding position, comprising fluxing the parts by submerging the parts in a bath of flux, removing the parts from the flux, immersing the parts in a bath of molten solder, removing the parts from the solder, and passing the parts through the flux, wherein the flux and the solder are in one container and the flux is positioned above the solder.

2. The method of claim 1 wherein the flux is a liquid, a powder, a gel, a solid, or a vapor.

3. The method of claim 1 wherein the flux is a medium of melted salt.

4. The method of claim 1 wherein the flux and the molten solder are in contact with each other.

5. A method for soldering a multiplicity of aluminum parts which parts are positioned in relative bonding position, comprising passing the parts into a flux, removing the parts from the flux, passing the parts into a solder bath, and removing the parts from the solder bath, wherein the flux and the solder are in a single container and the flux is positioned above the solder bath.

6. The method of claim 5 wherein the flux is a medium of melted salt.

7. The method of claim 5 wherein, before the passing into the flux, the parts are positioned in bonding position within a frame.

8. The method of claim 5 wherein the parts are cleaned before the passing into the flux.

9. The method of claim 5 which further comprises, after removal of the parts from the solder bath, removing residual flux from the parts.

10. The method of claim 5 wherein, as the parts are passed into the flux, the parts are immersed in the flux.

11. The method of claim 5 wherein the parts remain in the molten solder for about one to fifteen seconds.

12. The method of claim 5 wherein the parts remain in the flux for about one minute or less.

13. The method of claim 12 wherein the parts remain in the flux for about one to five seconds.

14. The method of claim 5 wherein the parts remain in the flux for a time sufficient to remove oxides and other debris from the surface of the parts.

15. The method of claim 14 where the passing into the solder bath is before the oxides reform on the surface of the parts.

16. The method of claim 5 wherein, following removal from the solder bath, the parts are through the flux.

17. The method of claim 16 wherein the flux and the solder baths are in contact with each other.

18. The method of claim 16 wherein the passing into the solder bath and removing from the solder bath are by passing through the flux.

19. The method of claim 18 wherein excess solder which is removed from the surface of the parts when passing through the flux is returned to the solder bath.

\* \* \* \* \*